United States Patent
Zhu

(10) Patent No.: US 10,663,400 B2
(45) Date of Patent: May 26, 2020

(54) HUMIDITY DETECTOR

(71) Applicant: BOE TECHNOLOGY GROUP CO., LTD., Beijing (CN)

(72) Inventor: Lin Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/366,021

(22) Filed: Mar. 27, 2019

(65) Prior Publication Data

US 2019/0369021 A1    Dec. 5, 2019

(30) Foreign Application Priority Data

May 31, 2018  (CN) .......................... 2018 1 0552355

(51) Int. Cl.
  *G01N 21/00* (2006.01)
  *G01N 21/59* (2006.01)
(52) U.S. Cl.
  CPC ..... *G01N 21/59* (2013.01); *G01N 2201/1214* (2013.01)
(58) Field of Classification Search
  CPC ............. G01N 21/1702; G01N 21/171; G01N 21/1717; G01N 21/255; G01N 29/2418
  USPC ......................................................... 356/432
  See application file for complete search history.

(56) References Cited

U.S. PATENT DOCUMENTS

2018/0120155 A1* 5/2018 Rosen .................. G01J 3/0286
2018/0188172 A1* 7/2018 Dehe .................. G01N 21/1702

* cited by examiner

*Primary Examiner* — Md M Rahman
(74) *Attorney, Agent, or Firm* — Collard & Roe, P.C.

(57) ABSTRACT

Disclosed is a humidity detector, which includes a light emitting part, a light receiving part and a humidity detecting part. The light emitting part and the light receiving part are positioned at two sides of the humidity detecting part along a first direction, and light emitted by the light emitting part is received by the light receiving part after passing through the humidity detecting part. The humidity detecting part includes a light transmittance adjustable part and a humidity sensitive deformation part, the humidity sensitive deformation part is configured to deform along with the change of the ambient humidity, and the light transmittance adjustable part is configured to change the transmittance to the light under the deformation effect of the humidity sensitive deformation part.

18 Claims, 3 Drawing Sheets

HUMIDITY DETECTOR

The application claims priority to the Chinese patent application No. 201810552355.X, filed May 31, 2018, the entire disclosure of which is incorporated herein by reference as part of the present application.

TECHNICAL FIELD

At least one embodiment of the present disclosure relates to a humidity detector.

BACKGROUND

Traditional humidity detection sensors include resistive or capacitive humidity detection sensors, for example, humidity sensors are the simplest humidity detection sensors. Humidity sensors mainly include resistive and capacitive humidity sensors. The characteristic of resistive humidity sensor is to cover a layer of film made of humidity sensitive material on the substrate. When water vapor in air is adsorbed on the humidity sensitive material, the resistivity and resistance value of resistive humidity sensor change. Humidity measurement can be carried out by using this characteristic. Capacitive humidity sensors are generally made of polymer film materials. Commonly used polymer materials include polystyrene, polyimide, butyric acid acetate fiber, etc. When the environmental humidity changes, the dielectric constant of the capacitive humidity sensor changes, making its capacitance also change, and its capacitance change is proportional to the relative humidity.

SUMMARY

At least one embodiment of the disclosure provides a humidity detector comprising: a light emitting part, a light receiving part and a humidity detecting part. The light emitting part and the light receiving part are located on both sides of the humidity detecting part along a first direction, and are configured such that light emitted by the light emitting part is received by the light receiving part after passing through the humidity detecting part. The humidity detecting part comprises a light transmittance adjustable part and a humidity sensitive deformation part, the humidity sensitive deformation part is configured to deform along with change of ambient humidity, and the light transmittance adjustable part is configured to change transmittance to the light under deformation effect of the humidity sensitive deformation part.

In some examples, the humidity sensitive deformation part is connected with the light transmittance adjustable part, and the light transmittance adjustable part is configured to be deformed by the deformation effect of the humidity sensitive deformation part to change a portion of the light transmittance adjustable part through which a light path of the light is passed.

In some examples, the light transmittance adjustable part comprises a plurality of light transmittance adjustable units arranged along the first direction, and the light transmittance adjustable units are configured to change shielding degree of the light under the deformation effect of the humidity sensitive deformation part.

In some examples, a first size of each of the plurality of light transmittance adjustable units in at least one direction perpendicular to a propagation direction of the light is adjustable.

In some examples, each of the plurality of light transmittance adjustable units has a second size in the first direction, and the first size changes with change of the second size.

In some examples, each of the light transmittance adjustable units includes a first sheet and a second sheet, the first sheet includes a first side and a second side opposite to each other, the second sheet includes a first side and a second side opposite to each other, the first side of the first sheet is connected to the first side of the second sheet in a same light transmittance adjustable unit, and the second side of the first sheet of one of two adjacent light transmittance adjustable units is connected to the second side of the second sheet of the other one of the two adjacent light transmittance adjustable units.

In some examples, the light transmittance adjustable units are configured to change the shielding degree of the light transmittance adjustable units to the light by changing an angle between the first sheet and the second sheet.

In some examples, the second side of the first sheet and the second side of the second sheet are disposed on one plane, and at least one of the second side of the first sheet and the second side of the second sheet is configured to slide on the plane to change a distance between a connecting end of the first side of the first sheet and the first side of the second sheet and the plane to change the shielding degree of the light transmittance adjustable units to the light.

In some examples, the light transmittance adjustable units are configured such that a number of the light transmittance adjustable units in a state of being passed through by the light path of the light is different when the humidity sensitive deformation part is in different deformation states, so as to change a portion of the light transmittance adjustable part being passed through by the light path of the light.

In some examples, heights of at least two of the light transmittance adjustable units are different in a direction perpendicular to the plane, so that the number of the light transmittance adjustable units in a state of being passed through by the light path of the light is different when the humidity sensitive deformation part is in different deformation states.

In some examples, the humidity detector comprises a substrate, the second side of the first sheet and the second side of the second sheet are disposed on the substrate, and at least two of the light transmittance adjustable units have different friction coefficients on the substrate.

In some examples, each of the light transmittance adjustable units further comprises an elastic member disposed between the second side of the first sheet and the second side of the second sheet, and elastic coefficients of the elastic members in at least two of the light transmittance adjustable units are different.

In some examples, a material of the light transmittance adjustable units is a paper-based material.

In some examples, the humidity sensitive deformation part comprises an opening through which a light path of the light emitted by the light emitting part passes.

In some examples, the humidity sensitive deformation part is located between the light transmittance adjustable part and the light emitting part, the humidity sensitive deformation part is located between the light transmittance adjustable part and the light receiving part, or the humidity sensitive deformation part is located between the light transmittance adjustable part and the light emitting part and between the light transmittance adjustable part and the light receiving part.

In some examples, the humidity sensitive deformation part and the light transmittance adjustable part are alternately arranged along the first direction.

In some examples, the humidity detector further comprises a chamber in which the light transmittance adjustable portion is located.

In some examples, the chamber comprises a transparent wall positioned between the light transmittance adjustable part and the humidity sensitive deformation part to isolate the light transmittance adjustable part from the humidity sensitive deformation part, the humidity sensitive deformation part is connected with the light transmittance adjustable part through the transparent wall, and the transparent wall is configured to move in the first direction after being subjected to the deformation effect of the humidity sensitive deformation part.

In some examples, the humidity detector further comprises a housing. The humidity sensitive deformation part is located in the housing, and the housing is provided with at least one hole to make an inner space of the housing communicate with an outer space of the housing.

In some examples, each of the plurality of light transmittance adjustable units is configured to switch between a state of shielding at least part of the light and a state of not shielding the light.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1A:
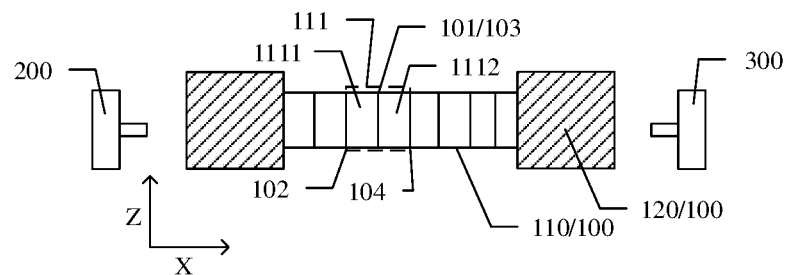
FIG. 1A is a top view of a partial structure of a humidity detector provided by an example of an embodiment of the disclosure.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the object which is described is changed, the relative position relationship may be changed accordingly.

Some conventional humidity detection sensors include a self-driving film (i.e., a self-driver), which can deform itself in response to changes in external conditions. For example, the self-driving thin film can realize large deformation when the external environment has extremely small humidity change.

The embodiment of the disclosure provides a humidity detector, which comprises a light emitting part, a light receiving part and a humidity detecting part. The light emitting part and the light receiving part are positioned at two sides of the humidity detecting part along a first direction, and light emitted by the light emitting part is received by the light receiving part after passing through the humidity detecting part. The humidity detecting part comprises a light transmittance adjustable part and a humidity sensitive deformation part, the humidity sensitive deformation part is configured to deform along with the change of the surrounding humidity, and the light transmittance adjustable part is configured to change the transmittance to light under the deformation effect of the humidity sensitive deformation part. The humidity detector provided by the embodiment of the disclosure is a photoelectric humidity detector, which can detect the humidity around the humidity detector according to the characteristic that the humidity detecting part has different light transmittance under different humidity conditions.

The humidity detector provided by the embodiment of the present disclosure will be described below with reference to the accompanying drawings.

An embodiment of the present disclosure provides a humidity detector. FIG. 1A is a top view of a partial structure of the humidity detector provided in the embodiment. As shown in FIG. 1A, the humidity detector provided in this embodiment includes a light emitting section 200, a light receiving section 300, and a humidity detecting section 100. In a first direction (i.e., the x direction shown in FIG. 1A), the light emitting section 200 and the light receiving section 300 are located on both sides of the humidity detecting section 100, and the light emitted by the light emitting section 200 (the light path of which is parallel to the first direction) is received by the light receiving section 300 after passing through the humidity detecting section 100. The humidity detecting section 100 includes a light transmittance adjustable section 110 and a humidity sensitive deformation section 120. The humidity sensitive deformation section 120 includes a deformation material that deforms with the change of humidity around the humidity detecting section 100, and the light transmittance adjustable section 110 is configured to change the transmittance of light emitted from the light emitting section 200 due to the deformation of the humidity sensitive deformation section 120, thereby changing the light intensity received by the light receiving section 300. Therefore, this embodiment can detect the humidity around the humidity detector according to the light intensity received by the light receiving section. For example, "transmittance" herein may refer to the ratio of the intensity of light passing through the light transmittance adjustable portion 110 to the intensity of light incident on the light transmittance adjustable portion 110. The humidity detector provided by the embodiment of the disclosure is a photoelectric humidity detector. The humidity sensitive deformation part in the humidity detector has different deformation quantities in different humidity environments, and different deformation quantities act on the light transmittance adjustable part, which will cause the light transmittance of the light transmittance adjustable part to the light emitted by the light emitting part to be different, thus changing the light intensity received by the light receiving part. Therefore, the humidity detector can detect the surrounding humidity according to the light intensity received by the light receiving part, analyze the humidity variation of the precision system, and improve the sealing strategy or the humidity control scheme.

For example, the humidity sensitive deformation part can be made of a material that expands due to absorbing water and shrinks due to water loss. When the humidity around the humidity detector increases, the humidity sensitive deformation part absorbs water and expands. When the humidity around the humidity detector decreases, the humidity sensitive deformation part shrinks due to water loss.

For example, as shown in FIG. 1A, in an example of this embodiment, the humidity sensitive deformation part 120 is located between the light transmittance adjustable part 110 and the light emitting part 200, and between the light transmittance adjustable part 110 and the light receiving part 300, that is, in the x direction, the humidity sensitive deformation part 120 is located on both sides of the light transmittance adjustable part 110.

For example, when the humidity around the humidity detector increases, the humidity sensitive deformation part 120 absorbs water and expands, and the humidity sensitive deformation parts 120 located on both sides gradually compress the light transmittance adjustable part 110 located in the middle during the expansion process, thereby increasing the portion of the light path of the light emitted by the light emitting part 200 passing through the light transmittance adjustable part 110 and reducing the transmittance of the light transmittance adjustable part 110 to the light emitted by the light emitting part 200.

For example, when the humidity around the humidity detector decreases, the humidity sensitive deformation part 120 loses water and shrinks. At this time, the humidity sensitive deformation part 120 located on both sides of the light transmittance adjustable part 110 gradually stretches the light transmittance adjustable part 110 located in the middle, thereby reducing the portion of the light path passing through the light transmittance adjustable part 110 and improving the transmittance of the light transmittance adjustable part 110 to the light emitted by the light emitting part 200.

When the humidity around the humidity detector is different, different deformation quantities generated by the humidity sensitive deformation part will result in different parts of the light path of the light transmittance adjustable part passing through the light (e.g., different shielding degrees of the light transmittance adjustable part to the light), so that the light transmittance of the light transmittance adjustable part to the light emitted by the light emitting part is different.

For example, the light emitting section 200 may adopt a light emitting diode, and the light receiving section 300 may adopt a photo sensitive diode. This embodiment includes but is not limited to this.

For example, the intensity of the light emitted by the light emitting section 200 is $I_{in}$, and the intensity of the light received by the light receiving section 300 is $I_{out}$. Due to different environmental humidity, the transmittance of the light transmittance adjusting section 110 to the light emitted by the light emitting section 200 is different. Therefore, $I_{out}=I_{in}*T$, T is a parameter indicating the transmittance of the light transmittance adjusting section 110. In this embodiment, the corresponding relationship between humidity and transmittance can be obtained through experimental calibration of the humidity detector in actual testing. For example, one-to-one correspondence can be made between humidity and transmittance to establish a lookup table for the two, or humidity and transmittance can be fitted to obtain a fitting function relationship between the two.

The humidity detector provided in this embodiment is a non-contact type photo detector, and humidity determination can be performed through photoelectric detection (photodiode converts optical signals into electrical signals). The humidity detector has high safety and can be used in scenes requiring non-contact. For example, the humidity detector can be a humidity trigger unit. When the system at the other end needs to be controlled in a non-contact state, the electromechanical system at the other end of the non-contact can be controlled through humidity change.

For example, the humidity sensitive deformation part 120 in this embodiment is connected to the light transmittance adjustable part 110, and the light transmittance adjustable part 110 is configured to be deformed by the deformation of the humidity sensitive deformation part 120.

For example, the light transmittance adjustable part 110 in this embodiment has better elasticity and recovery so that it can be compressed or stretched by the humidity sensitive deformation part 120. It should be noted that the deformation process of the humidity sensitive deformation part in this embodiment is only affected by the humidity around the humidity detector, and the light transmittance adjustable part hardly affects the deformation of the humidity sensitive deformation part.

For example, in another example of this embodiment, the humidity sensitive deformation part may be located only between the light transmittance adjustable part and the light emitting part, or between the light transmittance adjustable part and the light receiving part (not shown in the figure), the effect of the humidity sensitive deformation part on the light transmittance adjustable part in this example is the same as that in the example shown in FIG. 1A, and will not be repeated here.

Figure 1B:
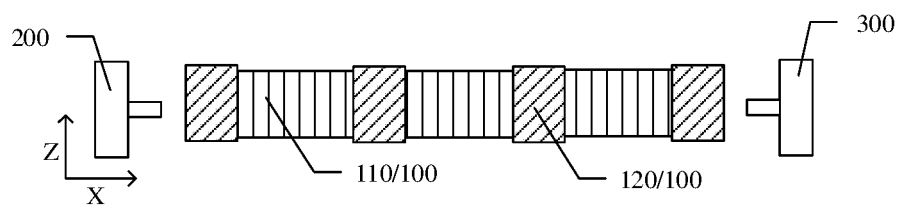
FIG. 1B is a top view of a partial structure of a humidity detector provided by another example of an embodiment of the disclosure.

For example, FIG. 1B is a top view of a partial structure of a humidity detector provided by another example of this embodiment. As shown in FIG. 1B, along the first direction (i.e., the x direction), the humidity sensitive deformation part 120 and the light transmittance adjustable portion 110 are alternately arranged. Since a large number of humidity sensitive deformation parts can be arranged in this example, when the humidity around the humidity detector changes slightly, these humidity sensitive deformation parts can generate larger deformation values, thus improving the detection accuracy of the humidity detector. This embodiment is not limited to only alternately arranging the humidity sensitive deformation part and the light transmittance adjustable part along the X direction. For example, the arrangement of the humidity sensitive deformation part and the light transmittance adjustable part may also include a two-dimensional arrangement alternately arranged along the X direction and the Z direction, etc.

Figure 2A:
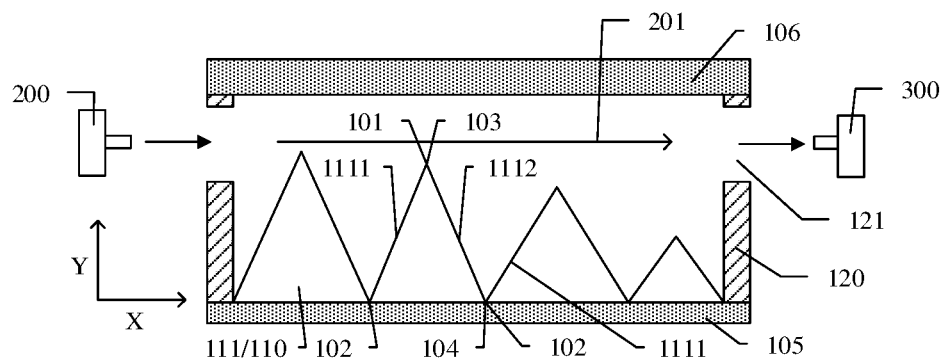
FIG. 2A and FIG. 2B are sectional views of the humidity detector shown in FIG. 1A.
Figure 2B:
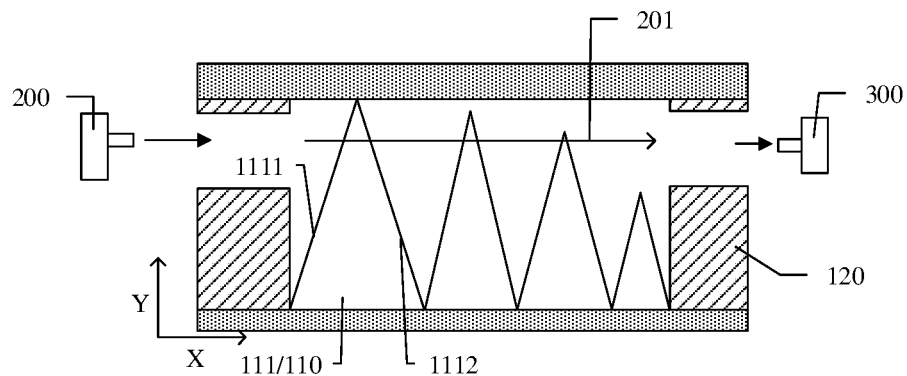

For example, FIG. 2A and FIG. 2B are sectional views of the humidity detector shown in FIG. 1A. FIG. 2A is a schematic diagram showing that the humidity sensitive deformation part does not undergo water absorption expansion (e.g., initial state), and FIG. 2B is a schematic diagram showing that the humidity sensitive deformation part undergoes water absorption expansion.

For example, as shown in FIG. 2A, in order to prevent the humidity sensitive deformation part 120 from affecting the transmittance of the humidity detecting section on the light emitted by the light emitting part 200, the light emitted by the light emitting part 200 in this embodiment does not pass through the humidity sensitive deformation part 120. For example, openings 121 may be provided at positions corresponding to the light emitting portion 200 and/or the light receiving portion 300 of the humidity sensitive deformation part 120 so that light emitted from the light emitting portion 200 passes through the openings 121 in the process of being received by the light receiving portion 300, i.e., the light path 201 of light emitted from the light emitting portion 200 passes through the openings 121. This embodiment is not limited to this, and the humidity sensitive deformation part may have other arrangement forms as long as the light emitted by the light emitting part does not pass through the humidity sensitive deformation part.

For example, as shown in FIG. 2A and FIG. 2B, the light transmittance adjustable unit 110 includes a plurality of light transmittance adjustable units 111 arranged in a first direction. FIG. 2A schematically shows an light path 201 of light emitted by the light emitting unit 200 does not pass through the light transmittance adjustable unit 111 when the humidity sensitive deformation part 120 does not undergo water absorption expansion. Here, "the light path 201 of the light emitted by the light emitting part 200 does not pass through the light transmittance adjustable unit 111" means that the light emitted by the light emitting part 200 does not pass through the light transmittance adjustable unit 111 in the process of being received by the light receiving part 300, or the light emitted by the light emitting part 200 is not shielded by the light transmittance adjustable unit 111. This embodiment is not limited to this.

For example, when the humidity sensitive deformation part 120 does not absorb water and expand, the light emitted by the light emitting part 200 may pass through the light transmittance adjustable unit 111 or be blocked by the light transmittance adjustable unit 111 in the process of being received by the light receiving part 300, but the light emitted by the light emitting part 200 cannot pass through all the light transmittance adjustable units 111 or the light emitted by the light emitting part 200 cannot be blocked by all the light transmittance adjustable units 111. That is, part of the light emitted by the light emitting section 200 passes through the light transmittance adjusting unit 111, and the other part does not pass through the light transmittance adjusting unit 111.

For example, as shown in FIG. 2B, when the humidity sensitive deformation part 120 absorbs water and expands, the light transmittance adjustable part 110 is compressed by the humidity sensitive deformation part 120 and deformed, compared with the case shown in FIG. 2A, the portion of the light transmittance adjustable part 110 in FIG. 2B which is passed through by the light path 201 of the light increases. For example, in the process of receiving the light emitted by the light emitting section 200 by the light receiving section 300, the number of light transmittance adjusting units 111 which is passed through increases, or the degree of shielding of the light by at least one light transmittance adjusting unit 111 increases, thereby reducing the transmittance of the light transmittance adjusting section 110 to the light emitted by the light emitting section 200.

At least one light transmittance adjustable unit 111 in this embodiment is configured to be switchable between the state of the light path 201 of the light passing through and the state of the light path 201 of the light not passing through under the deformation of the humidity sensitive deformation part 120. Here, "the state of the light path 201 of the light passing through" may mean that at least a part of the light emitted by the light emitting section 200 passes through the light transmittance adjusting unit 111, or at least a part of the light emitted by the light emitting section 200 is blocked by the light transmittance adjusting unit 111; "the state of the light path 201 of the light not passing through the light" may refer to that the light emitted by the light emitting section 200 does not pass through the light transmittance adjusting unit 111 at all, or the light emitted by the light emitting section 200 is not blocked by the light transmittance adjusting unit 111 at all. It should be noted that the light transmittance adjustable unit 111 in a state of being passed through by the light path 201 of the light may have different degrees of blocking of the light. For example, in the Y direction, the light transmittance adjustable unit 111 may be passed through by part or all of the light path to change the degree of blocking of the light by the light transmittance adjustable unit 111.

For example, as shown in FIG. 1A, FIG. 2A and FIG. 2B, each light transmittance adjustable unit 111 includes a first sheet 1111 and a second sheet 1112, in this embodiment, as an example, the side of the first sheet 1111 facing away from the second sheet 1112 faces the light emitting portion 200, and the side of the second sheet 1112 facing away from the first sheet 1111 faces the light receiving portion 300. FIG. 2A and FIG. 2B show a cross section of the light transmittance adjustable unit 111 taken by the XY plane, wherein the first sheet 1111 and the second sheet 1112 are shown with two line segments.

For example, as shown in FIG. 1A, FIG. 2A and FIG. 2B, the first sheet 1111 includes a first side 101 and a second side 102 opposite to each other, the second sheet 1112 includes a first side 103 and a second side 104 opposite to each other, the first side 101 of the first sheet 1111 is connected to the first side 103 of the second sheet 1112 in the same light transmittance adjustable unit 111, and the second side 102 of the first sheet 1111 of one of two adjacent light transmittance adjustable units 111 is connected to the second side 104 of the second sheet 1112 of the other of the two adjacent light transmittance adjustable units 111. It should be noted that the connection between the first side 101 of the first sheet 1111 and the first side 103 of the second sheet 1112 may be direct connection or indirect connection through other components. Similarly, the connection between the second side 102 of the first sheet 1111 of one of the two adjacent light transmittance adjustable units 111 and the second side 104 of the second sheet 1112 of the other of the two adjacent light transmittance adjustable units 111 may be direct connection or indirect connection through other components. The examples shown in FIG. 1A, FIG. 2A and FIG. 2B are described with the example that the first side 101 of the first sheet 1111 is directly connected to the first side 103 of the second sheet 1112, and the second side 102 of the first sheet 1111 is directly connected to the second side 104 of the second sheet 1112, in this case, the connection end between the first side 101 of the first sheet 1111 and the first side 103 of the second sheet 1112 is both the first side 101 of the first sheet 1111 and the first side 103 of the second sheet 1112.

For example, as shown in FIG. 2A and FIG. 2B, an example of this embodiment is described with the shape of the cross section of the light transmittance adjustable portion 110 cut by the XY plane including a zigzag shape as an example, wherein the cross section of each light transmittance adjustable unit 111 is a protrusion with a sharp angle facing upward (the direction indicated by the arrow Y).

For example, as shown in FIG. 2A and FIG. 2B, the light transmittance adjustable unit 111 is disposed on a substrate 105 (a plane) parallel to the x direction of the humidity detector, and the substrate 105 is in contact with the second side 102 of the first sheet 1111 and the second side 104 of the second sheet 1112 in the light transmittance adjustable unit 111. In addition, at least one of the second side 102 of the first sheet 1111 and the second side 104 of the second sheet 1112 is configured to slide on the substrate 105 to change the distance from the connection end of the first side 101 of the first sheet 1111 and the first side 103 of the second sheet 1112 to the substrate 105, so as to change the shielding degree of the light by the light transmittance adjustable unit 111.

For example, as shown in FIG. 2A and FIG. 2B, when the humidity sensitive deformation part 120 absorbs water and expands, the humidity sensitive deformation part 120 located on both sides of the light transmittance adjustable part 110 compresses the light transmittance adjustable part 110 toward the middle, and the angle between the first sheet 1111 and the second sheet 1112 of the at least one light transmittance adjustable unit 111 will be changed during the compression process.

For example, the angle between the first sheet 1111 and the second sheet 1112 of the at least one light transmittance adjustable unit 111 is reduced, thereby increasing the height of the light transmittance adjustable unit 111 in a direction perpendicular to the substrate 105 (i.e., Y direction), so that the at least one light transmittance adjustable unit 111 can be switched from a state of not being passed through by the light path 201 of the light to a state of being passed through by the light path 201 of the light, or increasing the degree of the at least one light transmittance adjustable unit 111 being passed through by the light path 201 of the light in the Y direction (degree of shielding the light). For example, the height of the light transmittance adjustable unit 111 in the Y direction varies with the size of the X direction, and the Y direction is perpendicular to the direction of the light path 201.

For example, the angle between the first sheet 1111 and the second sheet 1112 of the light transmittance adjustable unit 111 ranges from 0 to 180 degrees.

For example, the first light transmittance adjustable unit 111 in the x direction (direction from left to right) of FIG. 2A will be described as an example. As shown in FIG. 2A, when the humidity sensitive deformation part 120 does not absorb water and expand, the first light transmittance adjustable unit 111 is in a state of not being passed through by the light path 201 of light. As shown in FIG. 2B, after the humidity sensitive deformation part 120 absorbs water and expands, the first light transmittance adjustable unit 111 is compressed, and the angle between the first sheet 1111 and the second sheet 1112 is reduced, thereby increasing the height of the light transmittance adjustable unit 111 in the Y direction. At this time, the first light transmittance adjustable unit 111 is in a state of being passed through by the light path 201 of light. Therefore, the first light transmittance adjustable unit 111 shields the light emitted by the light emitting part 200 when the humidity sensitive deformation part 120 absorbs water and expands, thereby reducing the transmittance of the light transmittance adjustable part 110 to the light emitted by the light emitting part 200.

For example, when the expansion degree of the humidity sensitive deformation part 120 continues to increase, the height of the first light transmittance adjustable unit 111 in the Y direction continues to increase, which can increase the degree of shielding light, thereby continuing to reduce the transmittance of the light transmittance adjustable part 110 to the light emitted by the light emitting part 200.

For example, the connection end between the first side 101 of the first sheet 1111 and the first side 103 of the second sheet 1112 (i.e., the first side 101 of the first sheet 1111 or the first side 103 of the second sheet 1112) of the first light transmittance adjustable unit 111 is switched from being not passed through the light path 201 as shown in FIG. 2A to being passed through by the light path 201 as shown in FIG. 2B.

For example, as shown in FIG. 2A and FIG. 2B, when the humidity sensitive deformation part 120 is not deformed, the heights of at least two light transmittance adjustable units 111 are different along a second direction perpendicular to the first direction (i.e., Y direction), this embodiment is described with the example that the heights of the light transmittance adjustable units 111 included in the light transmittance adjustable part 110 are different.

For example, this embodiment is described with the example that the heights of the plurality of light transmittance adjustable units 111 are sequentially decreased along the X direction. This embodiment includes but is not limited to this, and the height of the light transmittance adjustable unit(s) located in the middle may be higher than the height of the light transmittance adjustable units located on both sides.

For example, when the humidity sensitive deformation part 120 is in different deformation states, the number of light transmittance adjusting units 111 in the state of being passed through by the light path 201 of the light is different, so that the light transmittance adjusting part 110 has different degrees of blocking the light, thereby changing the light transmittance of the light transmittance adjusting part 110.

For example, as shown in FIG. 2A and FIG. 2B, when the humidity sensitive deformation part 120 gradually absorbs water and expands, the first light transmittance adjustable unit 111 to the third light transmittance adjustable unit 111 are compressed by the humidity sensitive deformation part 120 in the X direction, and are sequentially switched from a state of being not passed through the light path 201 to a state of being passed through by the light path 201, that is, when the humidity sensitive deformation part 120 gradually expands, the number of light transmittance adjustable units 111 in a state of being passed through by the light path 201 of the light gradually increases, so that the light emitted by the light emitting section 200 is blocked by more and more light transmittance adjustable units 111 to reduce the light transmittance of the light transmittance adjustable section 110. At the same time, after the light transmittance adjustable unit 111 is already in a state of being passed through by the light path 201 of the light, as the humidity sensitive deformation part 120 gradually expands, the degree of the light transmittance adjustable unit 111 being passed through by the light path 201 of the light in the Y direction gradually increases, and the degree of blocking the light gradually increases, so that the light transmittance of the light transmittance adjustable part 110 can be further reduced.

Similarly, when the humidity sensitive deformation part 120 is gradually shrunk due to water loss, the number of light transmittance adjustable units 111 in a state of being passed through the light path 201 of the light gradually decreases, so that the light emitted by the light emitting part 200 is shielded by fewer and fewer light transmittance adjustable units 111 to improve the light transmittance of the light transmittance adjustable part 110. Alternatively, the degree to which the light transmittance adjustable unit 111 being passed through by the light path 201 of the light in the Y direction gradually decreases, and the degree to which the light is shielded gradually decreases, so that the light transmittance of the light transmittance adjustable unit 110 can be improved.

For example, the humidity detector further includes a top plate 106 opposite to the substrate 105. When the humidity sensitive deformation part 120 does not absorb water and expand, the light path 201 of the light emitted by the light emitting part 200 may be located between the light transmittance adjustable part 110 and the top plate 106.

For example, when the humidity sensitive deformation part 120 absorbs water and expands, the height of the light transmittance adjustable unit 111 in the Y direction gradually increases. When the end of the light transmittance adjustable unit 111 near the top plate 106 (e.g., the first side 101 of the first sheet 1111 of the light transmittance adjustable unit 111) contacts the top plate 106, the height of the light transmittance adjustable unit 111 will remain unchanged, and at this time, the angle between the first sheet 1111 and the second sheet 1112 will remain unchanged.

For example, the first side 101 of the first sheet 1111 of the light transmittance adjustable unit 111 is parallel to the second side 102, and the distance between the two sides is equal to the distance between the top plate 106 and the substrate 105 (i.e., the length of the line segment representing the first sheet 1111 shown in FIG. 2A is equal to the distance between the top plate 106 and the substrate 105), when the light transmittance adjustable unit 111 contacts the top plate 106, the first sheet 1111 is perpendicular to the substrate 105. This embodiment is not limited to this. For example, the distance between the first side 101 and the second side 102 of the first sheet 1111 may be larger than the distance between the top plate 106 and the substrate 105. For example, the distance between the first side 101 and the second side 102 of the first sheet-like portion 1111 may be smaller than the distance between the top plate 106 and the substrate 105. It is possible to ensure that the light emitted by the light emitting portion 200 can be blocked when the height of the light transmittance adjustable unit 111 increases.

For example, as shown in FIG. 2B, in one example of this embodiment, the second side 102 of the first sheet 1111 and the second side 104 of the second sheet 1112 are disposed on the substrate 105, and at least two light transmittance adjustable units 111 have different friction coefficients with the substrate 105, so that the number of light transmittance adjustable units 111 in the state of being passed through the light path 201 of the light is different when the humidity sensitive deformation part 120 is in different deformation states. For example, the plurality of light transmittance adjustable units 111 may be switched between a state in which at least part of the light is blocked and a state in which the light is not blocked.

For example, in the X direction, the friction coefficient of the portion where the plurality of light transmittance adjustable units 111 contact the substrate 105 gradually increases, so that when compressed, the first light transmittance adjustable unit 111 to the third light transmittance adjustable unit 111 in the X direction are sequentially switched from a state of being not passed through by the light path 201 to a state of being passed through by the light path 201. This example is not limited to this, but the friction coefficient between the light transmittance adjustable unit located in the middle and the substrate is lower than the friction coefficient between the light transmittance adjustable units located on both sides and the substrate, so that the light transmittance adjustable unit located in the middle is firstly switched from a state of being not passed through by the light path to a state of being passed through by the light path.

For example, in this example, when the humidity sensitive deformation part 120 does not undergo water absorption expansion, the heights of the plurality of light transmittance adjustable units 111 may be the same or different. When the heights of the plurality of light transmittance adjustable units 111 are different, the friction coefficient between the plurality of light transmittance adjustable units 111 and the substrate 105 is set to increase as the height decreases.

Figure 2C:
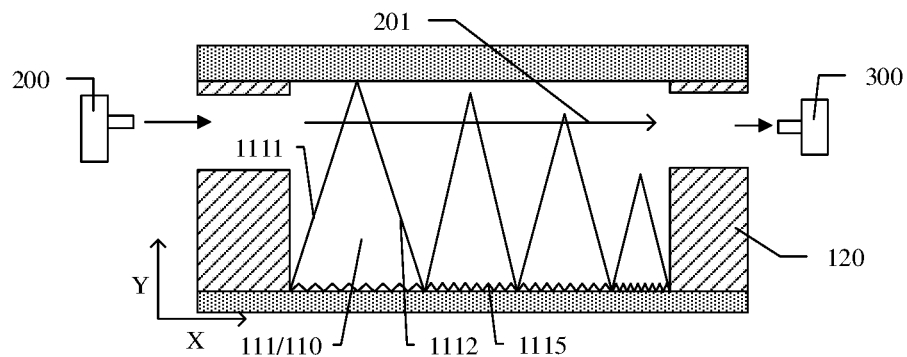
FIG. 2C is a cross-sectional view of a humidity detector provided by another example of an embodiment of the disclosure.

For example, FIG. 2C is a schematic cross-sectional view of a humidity detector provided by another example of this embodiment. As shown in FIG. 2C, in another example of this embodiment, the light transmittance adjustable unit 111 further includes an elastic member 1115 disposed between the second side of the first sheet portion 1111 and the second side of the second sheet portion 1112, and the elastic coefficients of the elastic members 1115 in the at least two light transmittance adjustable units 111 are different, so that the number of the light transmittance adjustable units 111 in the state of being passed through by the light path 201 of the light is different when the humidity sensitive deformation part 120 is in different deformation states.

For example, the elastic member 1115 may include a spring.

For example, as shown in FIG. 2C, the elastic coefficient of the elastic member 1115 of the plurality of light transmittance adjustable units 111 gradually increases along the X direction, so that when the humidity sensitive deformation part 120 compresses the light transmittance adjustable units 110, the plurality of light transmittance adjustable units 111 are sequentially compressed from left to right, thereby sequentially switching from a state of being not passed through by the light path 201 to a state of being passed through by the light path 201, this embodiment is not limited to this, as long as the degree of light shielding by at least two light transmittance adjustable units varies gradually with the degree of deformation of the humidity sensitive deformation part.

For example, as shown in FIG. 2A to FIG. 2C, when the moisture sensitive deformation material 120 is in an unexpanded state, the plurality of light transmittance adjustable units 111 may be regarded as being in an initial state. In an example of this embodiment, the shape and size of the first sheet 1111 and the second sheet 1112 in each light transmittance adjustable unit 111 in the initial state are exactly the same, and the shape and size of the first sheets 1111 (the second sheets 1112) included in the plurality of light transmittance adjustable units 111 are exactly the same. At this time, the initial heights of the at least two light transmittance adjustable units 111 can be made different by setting different angles between the first sheet 1111 and the second sheet 1112 of the at least two light transmittance adjustable units 111.

For example, this example can make the angle between the first sheet 1111 and the second sheet 1112 of the at least two light transmittance adjustable units 111 different by setting the lengths of the elastic members 1115 of the at least two light transmittance adjustable units 111 different along the X direction.

For example, the longer the length of the elastic member 1115 in the X direction is, the larger the angle between the first sheet 1111 and the second sheet 1112 can be, so that the initial height of the light transmittance adjustable unit 111 is lower. In this example, the plurality of light transmittance adjustable units are in an initial state including the elastic member in an initial state, that is, the elastic member is in a state in which it is neither stretched nor compressed.

For example, when the heights of the at least two light transmittance adjustable units 111 are different in the initial state, the friction coefficients between the light transmittance adjustable units 111 and the substrate 105 may be set to be the same or different, or the elastic coefficients of the elastic members 1115 of the light transmittance adjustable units 111 may be set to be the same or different as long as they gradually change with the degree of deformation of the humidity sensitive deformation part 120. At least two light transmittance adjustable units 111 have different degrees of light blocking, thus ensuring that the degree of light blocking by the light transmittance adjustable unit 110 changes with the change of the degree of deformation of the humidity sensitive deformation part 120.

For example, in this example, the angles between the first sheet 1111 and the second sheet 1112 in the plurality of light transmittance adjustable units 111 may be set to be the same, but the friction coefficients of the at least two light transmittance adjustable units 111 and the substrate 105 are set differently, or the elastic coefficients of the elastic members 1115 of the at least two light transmittance adjustable units 111 are different, so that when the deformation degree of the humidity sensitive deformation part 120 gradually changes, at least two light transmittance adjustable units 111 are compressed to different degrees (i.e., different heights), so that the light shielding degree of at least two light transmittance adjustable units 111 is different, thereby ensuring that the light shielding degree of the light transmittance adjustable unit 110 changes with the change of the deformation degree of the humidity sensitive deformation part 120.

For example, in another example of this embodiment, the shape and size of the first sheet 1111 and the second sheet 1112 in each light transmittance adjustable unit 111 in the initial state are exactly the same, but the shape and size of the first sheets 1111 (the second sheets 1112) included in the plurality of light transmittance adjustable units 111 are not exactly the same or completely different.

For example, in this example, when the angles between the first sheet 1111 and the second sheet 1112 of the plurality of light transmittance adjustable portions 111 are set to be the same, the initial heights of the at least two light transmittance adjustable units 111 are different. Therefore, as the degree of deformation of the humidity sensitive deformation part 120 gradually changes, the degree of shielding of light by the at least two light transmittance adjustable units 111 is different, thus ensuring that the degree of shielding of light by the light transmittance adjustable portion 110 changes with the degree of deformation of the humidity sensitive deformation part 120.

For example, in this example, the lengths of the elastic members 1115 between the first sheet 1111 and the second sheet 1112 of the plurality of light transmittance adjustable portions 111 in the X direction may be set to be the same, so that the angles between the first sheet 1111 and the second sheet 1112 of the plurality of light transmittance adjustable portions 111 may be set to be the same.

For example, in this example, the lengths of the elastic members 1115 between the first sheet 1111 and the second sheet 1112 of the plurality of light transmittance adjustable units 111 in the X direction may be set differently so that the angles between the first sheet 1111 and the second sheet 1112 of the at least two light transmittance adjustable units 111 are set differently. At this time, the length of the elastic member 1115 of the light transmittance adjustable unit 111 having the first sheet 1111 with a larger size may be set shorter, and the length of the elastic member 1115 of the light transmittance adjustable unit 111 having the first sheet 1111 with a smaller size may be set longer, so that the initial heights of the at least two light transmittance adjustable units 111 are different, and thus the shielding degree of the at least two light transmittance adjustable units 111 to light rays is different, so as to ensure that the shielding degree of the light transmittance adjustable units 110 to light rays varies with the change of the deformation degree of the humidity sensitive deformation part 120.

For example, in another example of this embodiment, the size of the first sheet portion 1111 of the at least one light transmittance adjustable portion 111 may be different from the size of the second sheet portion 1112, as long as the light shielding degree of the at least two light transmittance adjustable units 111 is different as the deformation degree of the humidity sensitive deformation part 120 gradually changes.

For example, the light transmittance of different light transmittance adjustable units 111 may be the same or different. For example, in this embodiment, the light transmittance of the light transmittance adjustable unit 111 having a larger height in the Y direction may be set to be larger, and the light transmittance of the light transmittance adjustable unit 111 having a smaller height in the Y direction may be set to be smaller, that is, the light transmittance of the light transmittance adjustable units 111 may be set to be different depending on the height of the light transmittance adjustable units 111. Therefore, when the light transmittance adjustable unit 111 is switched from the state of being not passed through by the light path 201 to the state of being passed through by the light path 201 in sequence, the light transmittance of the light transmittance adjusting part 110 changes greatly, so that the humidity change around the humidity detector can be detected more sensitively.

Figure 3A:
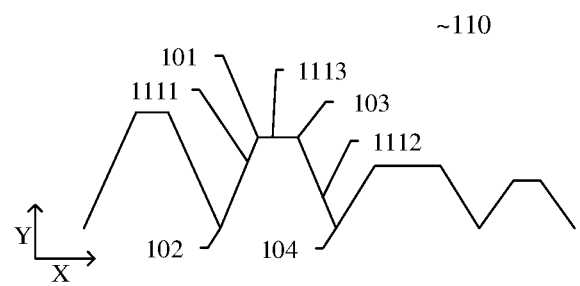
FIG. 3A and FIG. 3B are schematic cross-sectional views of a light transmittance adjustable portion provided by another example of an embodiment of the present disclosure.
Figure 3B:
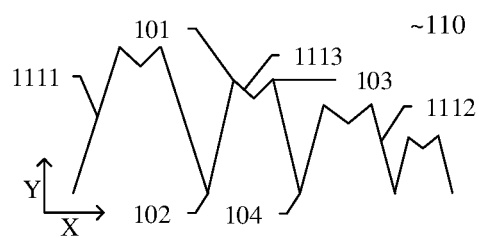

For example, FIG. 3A and FIG. 3B are schematic cross-sectional views of a light transmittance adjustable portion provided by another example of this embodiment. FIG. 3A is a schematic cross-sectional view when the light transmittance adjustable part is not compressed by the humidity sensitive deformation part, and FIG. 3B is a schematic cross-sectional view after the light transmittance adjustable part is compressed by the humidity sensitive deformation part. As shown in FIG. 3A, the light transmittance adjustable unit 111 provided in this example further includes a first sheet-like structure 1113 located between the first sheet 1111 and the second sheet 1112, therefore, the first side 101 of the first sheet 1111 of each light transmittance adjustable unit 111 is connected to the first side 103 of the second sheet 1112 through the first sheet-like structure 1113.

For example, as shown in FIG. 3B, when the light transmittance adjustable part 110 is compressed by the humidity sensitive deformation part, the angle between the first sheet 1111 and the second sheet 1112 of the light transmittance adjustable unit 111 becomes smaller to increase the height of the light transmittance adjustable unit 111 in the Y direction. In the process that the angle between the first sheet 1111 and the second sheet 1112 becomes smaller, the first sheet-like structure 1113 connecting the first sheet 1111 and the second sheet 1112 is deformed, for example, recessed downward (in the direction opposite to the arrow in the Y direction) to further reduce the angle between the first sheet 1111 and the second sheet 1112, thereby increasing the height of the light transmittance adjustable unit 111 in the Y direction. The light transmittance adjustable unit in this example has the same deformation characteristics and functions as the light transmittance adjustable unit shown in FIG. 2A, and will not be repeated here.

Figure 4:
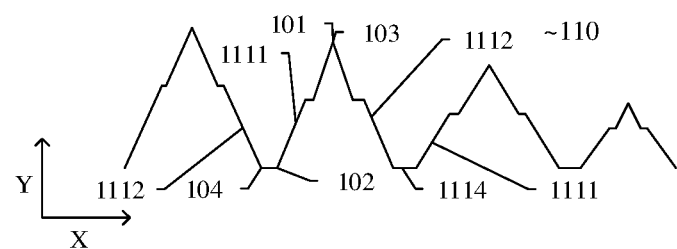
FIG. 4 is a schematic cross-sectional view of a light transmittance adjustable portion provided by another example of an embodiment of the present disclosure.

For example, FIG. 4 is a schematic cross-sectional view of a light transmittance adjustable portion provided by another example of this embodiment. As shown in FIG. 4, the cross sections of the first sheet 1111 and the second sheet 1112 in the light transmittance adjustable unit in this example are non-linear in shape of, for example, fold lines.

For example, the adjacent light transmittance adjustable units in this example are connected by the second sheet-like structure 1114, that is, the second side 102 of the first sheet 1111 of one of the two adjacent light transmittance adjustable units 111 and the second side 104 of the second sheet 1112 of the other are connected by the second sheet-like structure 1114. The light transmittance adjustable unit in this example has the same deformation characteristics and functions as the light transmittance adjustable unit shown in FIG. 2A, and will not be repeated here.

For example, the material of the light transmittance adjustable unit provided in this embodiment is a paper-based material, and the light transmittance adjustable part is a paper-based folded structure. The paper-based material includes transparent paper, and the light transmittance can be adjusted by the ratio of the materials. For example, when different paper-based molecules are combined, the paper-based materials will have different light transmittance. In this embodiment, the transmittance of different light transmittance adjustable units can be the same or different by proportioning the paper-based materials. This embodiment includes but is not limited to this, for example, the light transmittance adjustable units may also adopt other materials with elasticity and capable of changing the light transmittance.

Figure 5:
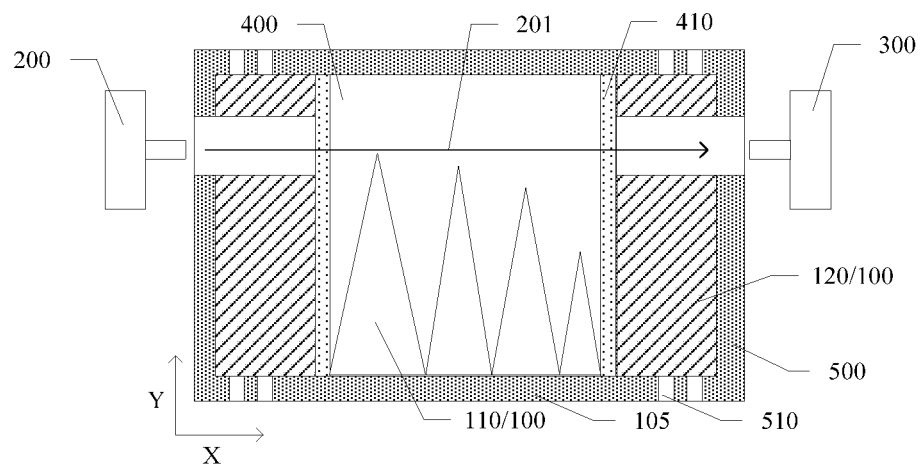
FIG. 5 is a cross-sectional view of a humidity detector according to an embodiment of the present disclosure.

For example, FIG. 5 is a sectional view of a humidity detector provided in this embodiment. As shown in FIG. 5, the humidity detector provided in this embodiment further includes a chamber 400 in which the light transmittance adjustable portion 110 is located. The chamber 400 includes a transparent wall 410 located between the light transmittance adjustable portion 110 and the humidity sensitive deformation part 120 to completely isolate the two. When the humidity sensitive deformation part 120 absorbs water and expands, the light emitted by the light emitting part 200 passes through the transparent wall 410 and the light transmittance adjustable part 110 and is received by the light receiving part 300.

The transparent wall in this embodiment can not only ensure the transmittance of light emitted by the light emitting part, but also prevent the light transmittance adjustable part from being affected by water vapor, thus ensuring that the transmittance of the light transmittance adjustable part is not affected by other factors other than the humidity sensitive deformation part and has better safety.

For example, the material of the transparent wall 410 in this embodiment may be polymethyl methacrylate. This embodiment includes but is not limited to this, as long as the material of the transparent wall is transparent medium with high transparency and waterproof.

For example, as shown in FIG. 5, the humidity sensitive deformation part 120 is connected to the light transmittance adjustable part 110 through a transparent wall 410, and the transparent wall 410 is configured to move in a first direction (x direction) after being subjected to deformation effect by the humidity sensitive deformation part 120, that is, the transparent wall 410 is disposed on the substrate 105 and can slide relative to the substrate 105.

For example, when the humidity sensitive deformation part 120 absorbs water and expands, the humidity sensitive deformation part 120 exerts a pushing force on the transparent wall 410. At this time, the transparent wall 410 and the humidity sensitive deformation part 120 compress the light transmittance adjustable part 110 together. When the humidity sensitive deformation part 120 shrinks due to water loss, the humidity sensitive deformation part 120 exerts a pulling force on the transparent wall 410, and at this time, the transparent wall 410 and the humidity sensitive deformation part 120 stretch the light transmittance adjustable part 110 together.

For example, as shown in FIG. 5, the humidity detector further includes a housing 500 with a fixed shape, the humidity sensitive deformation part 120 is located in the housing 500, and the housing 500 is provided with at least one hole 510 to make the humidity sensitive deformation part 120 contact with air around the humidity detector. The contact here means that the air at the humidity sensitive deformation part 120 and the air outside the housing 500 can be circulated, for example, the hole 510 connects the inner space of the housing with the outer space of the housing, so that the humidity of the air at the humidity detector can be detected. In this embodiment, the shell is made of metal or a material with large hardness, so as to prevent the housing from being extruded and deformed when the humidity sensitive deformation part absorbs water and expands.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

The above description is only a specific embodiment of the present disclosure, but the scope of protection of the present disclosure is not limited to this. Any person familiar with the technical field can easily think of changes or substitutions within the technical scope of the present disclosure, and should be covered within the scope of protection of the present disclosure. Therefore, the scope of protection of the present disclosure should be based on the scope of protection of the claims.

What is claimed is:

1. A humidity detector comprising:
   a light emitting part, a light receiving part and a humidity detecting part, wherein
   the light emitting part and the light receiving part are located on both sides of the humidity detecting part along a first direction, and are configured such that light emitted by the light emitting part is received by the light receiving part after passing through the humidity detecting part;

the humidity detecting part comprises a light transmittance adjustable part and a humidity sensitive deformation part, the humidity sensitive deformation part is configured to deform along with change of ambient humidity, and the light transmittance adjustable part is configured to change transmittance to the light under deformation effect of the humidity sensitive deformation part;

a chamber in which the light transmittance adjustable portion is located, wherein the chamber comprises a transparent wall positioned between the light transmittance adjustable part and the humidity sensitive deformation part to isolate the light transmittance adjustable part from the humidity sensitive deformation part, the humidity sensitive deformation part is connected with the light transmittance adjustable part through the transparent wall, and the transparent wall is configured to move in the first direction after being subjected to the deformation effect of the humidity sensitive deformation part.

2. The humidity detector according to claim 1, wherein the humidity sensitive deformation part is connected with the light transmittance adjustable part, and the light transmittance adjustable part is configured to be deformed by the deformation effect of the humidity sensitive deformation part to change a portion of the light transmittance adjustable part through which a light path of the light is passed.

3. The humidity detector according to claim 1, wherein the light transmittance adjustable part comprises a plurality of light transmittance adjustable units arranged along the first direction, and the light transmittance adjustable units are configured to change shielding degree of the light under the deformation effect of the humidity sensitive deformation part.

4. The humidity detector according to claim 3, wherein a first size of each of the plurality of light transmittance adjustable units in at least one direction perpendicular to a propagation direction of the light is adjustable.

5. The humidity detector according to claim 4, wherein each of the plurality of light transmittance adjustable units has a second size in the first direction, and the first size changes with change of the second size.

6. The humidity detector according to claim 3, wherein each of the light transmittance adjustable units includes a first sheet and a second sheet, the first sheet includes a first side and a second side opposite to each other, the second sheet includes a first side and a second side opposite to each other, the first side of the first sheet is connected to the first side of the second sheet in a same light transmittance adjustable unit, and the second side of the first sheet of one of two adjacent light transmittance adjustable units is connected to the second side of the second sheet of the other one of the two adjacent light transmittance adjustable units.

7. The humidity detector according to claim 6, wherein the light transmittance adjustable units are configured to change the shielding degree of the light transmittance adjustable units to the light by changing an angle between the first sheet and the second sheet.

8. The humidity detector according to claim 6, wherein the second side of the first sheet and the second side of the second sheet are disposed on one plane, and at least one of the second side of the first sheet and the second side of the second sheet is configured to slide on the plane to change a distance between a connecting end of the first side of the first sheet and the first side of the second sheet and the plane to change the shielding degree of the light transmittance adjustable units to the light.

9. The humidity detector according to claim 8, wherein the light transmittance adjustable units are configured such that a number of the light transmittance adjustable units in a state of being passed through by the light path of the light is different when the humidity sensitive deformation part is in different deformation states, so as to change a portion of the light transmittance adjustable part being passed through by the light path of the light.

10. The humidity detector according to claim 9, wherein heights of at least two of the light transmittance adjustable units are different in a direction perpendicular to the plane, so that the number of the light transmittance adjustable units in a state of being passed through by the light path of the light is different when the humidity sensitive deformation part is in different deformation states.

11. The humidity detector according to claim 10, wherein the humidity detector comprises a substrate, the second side of the first sheet and the second side of the second sheet are disposed on the substrate, and at least two of the light transmittance adjustable units have different friction coefficients on the substrate.

12. The humidity detector according to claim 10, wherein each of the light transmittance adjustable units further comprises an elastic member disposed between the second side of the first sheet and the second side of the second sheet, and elastic coefficients of the elastic members in at least two of the light transmittance adjustable units are different.

13. The humidity detector according to claim 3, wherein a material of the light transmittance adjustable units is a paper-based material.

14. The humidity detector of claim 3, wherein each of the plurality of light transmittance adjustable units is configured to switch between a state of shielding at least part of the light and a state of not shielding the light.

15. The humidity detector according to claim 1, wherein the humidity sensitive deformation part comprises an opening through which a light path of the light emitted by the light emitting part passes.

16. The humidity detector according to claim 1, wherein the humidity sensitive deformation part is located between the light transmittance adjustable part and the light emitting part, the humidity sensitive deformation part is located between the light transmittance adjustable part and the light receiving part, or the humidity sensitive deformation part is located between the light transmittance adjustable part and the light emitting part and between the light transmittance adjustable part and the light receiving part.

17. The humidity detector according to claim 1, wherein the humidity sensitive deformation part and the light transmittance adjustable part are alternately arranged along the first direction.

18. The humidity detector according to claim 1, further comprising a housing, wherein the humidity sensitive deformation part is located in the housing, and the housing is provided with at least one hole to make an inner space of the housing communicate with an outer space of the housing.

* * * * *